United States Patent [19]

Beck et al.

[11] Patent Number: 4,704,568
[45] Date of Patent: Nov. 3, 1987

[54] LINEAR INDUCTION MOTOR TRANSPORT SYSTEM

[75] Inventors: James A. Beck, Racine; Thomas L. Beck, Union Grove, both of Wis.

[73] Assignee: Unico, Inc., Franksville, Wis.

[21] Appl. No.: 851,149

[22] Filed: Apr. 14, 1986

[51] Int. Cl.⁴ .............................................. G05B 19/24
[52] U.S. Cl. .................................... 318/687; 318/571; 318/135
[58] Field of Search ................. 318/135, 571, 687, 38, 318/34; 198/523, 805, 855; 271/157, 158, 159, 193, 194, 901; 364/469, 471, 472, 474, 475, 478; 310/10, 12, 13, 14

[56] References Cited

U.S. PATENT DOCUMENTS

| 3,549,966 | 12/1970 | Wilson | 318/135 |
|---|---|---|---|
| 3,577,929 | 5/1971 | Onoda | 310/12 X |
| 3,610,695 | 10/1971 | Yabuta | 198/619 |
| 3,675,757 | 7/1972 | Yabuta | 310/12 X |
| 3,803,466 | 4/1974 | Starkey | 318/135 X |
| 3,850,109 | 11/1974 | Thornton | 318/135 X |
| 3,904,942 | 9/1975 | Holtz | 104/292 |
| 3,914,669 | 10/1975 | Holtz | 318/135 X |
| 3,914,670 | 10/1975 | Holtz | 104/292 |
| 3,919,607 | 11/1975 | Habock et al. | 318/135 |
| 4,077,507 | 3/1978 | Boquet | 310/12 X |
| 4,381,478 | 4/1983 | Saijo et al. | 318/687 X |
| 4,491,777 | 1/1985 | Beck et al. | 318/571 |
| 4,590,411 | 5/1986 | Kelly | 318/687 |
| 4,595,870 | 6/1986 | Chitayat | 318/687 |

*Primary Examiner*—William M. Shoop, Jr.
*Assistant Examiner*—Shik Luen Paul Ip
*Attorney, Agent, or Firm*—Quarles & Brady

[57] ABSTRACT

A transport and stacker system in which the articles being transported are propelled in their path of travel by the moving magnetic field of a linear induction motor. The magnetic field also functions to attract the moving articles toward the linear motor and in order to overcome this attracting force and air bearing is provided. The air pressure acting against the attracting force is just sufficient to move the articles a slight distance away from the linear induction motor so that the articles move in the path of travel while suspended in air out of contact with the physical surface of the motor. When the desired position is reached, the article is dropped on a stack by deenergizing the magnetic field.

5 Claims, 9 Drawing Figures

LINEAR INDUCTION MOTOR TRANSPORT SYSTEM

BACKGROUND OF THE INVENTION

The invention pertains to the transport of articles along a predetermined path while reducing to an absolute minimum any resistance to such movement of the article.

It frequently occurs in a manufacturing facility that a flat workpiece must be transported a distance from a machine and then dropped at a specific location to form a stack. For example, sheet material may be fed into a press where it is sheared into panels. The panels are removed from the machine, conveyed away from the machine, and then stacked on a pallet or the like.

It can be appreciated that the most convenient way of performing this operation is by suspending the panels from the lower span of the conveyor and then releasing the panel when it arrives at the stack. To this end it has been the practice to provide a continuous loop belt type conveyor with a series of electromagnets fixedly mounted within the loop and in engagement with the inner surface of the lower span of the belt. The belt is driven relative to the electromagnets. As the panels are removed from the machine they are transferred to the lower span of the conveyor where the energized electromagnets act on them to draw the panels against the moving belt and retain them there while the belt moves the panel to the stacking location where they are released from the conveyor by the electromagnets to drop onto the stack.

In some installations the electromagnets are replaced by vacuum assemblies which function through the conveyor belt to apply a vacuum for retaining the workpieces against the surface of the belt for movement therewith.

In these prior art constructions the conveyor belt is held against the surface of either the magnets or the suction devices while it is moving. This creates friction that must be overcome by increased power for driving the conveyor and which also causes undue wear and tear on the conveyor belt.

In the presently available stacking systems employing a conveyor to transport the article to the stack, the article is released from the belt while the belt is moving. As a result, after the article is released from the belt it does not drop in a direct vertical path but continues to move forwardly as well. Therefore, in order to position the article on the stack, the receiving platform is provided with a backstop to stop the forward movement of the article and position it on the stack. Such bumping of the article against the backstop has a tendency to mar the article. Irregular articles are also difficult to stack with this system.

Another potential source of damage to the article being transported lies in the fact that the article must be transferred to the conveyor while the belt is moving, to produce substantial abrasion between the belt and article.

Another disadvantage in the prior art structures is that the speed of the belt cannot be readily varied. Once its velocity is established it will remain uniform during the operation and it dictates the spacing of the parts on the conveyor.

SUMMARY OF THE INVENTION

The present invention relates to an article transport and stacking system employing linear induction motors or LIMs for moving and stacking the articles. The articles being transported with this system will be sheets or panels that have been received from a fabricating machine such as a press or shear. The articles must be a ferromagnetic material, such as steel, and although it need not be perfectly flat it must present flat surfaces of sufficient area to function with the features of the present invention. The linear induction motors are inverted so that their operating surfaces are facing downward and the articles are fed to this downwardly facing surface for rectilinear movement to the stacking location where they are released to drop by gravity onto the stack. The articles are moved in their path of travel by the moving magnetic field developed by the stators so that the moving articles are comparable to the rotors of conventional induction motors. However, the movement of the articles is in a rectilinear path rather than a rotary path because they are operating with a stator that extends in a straight line.

The moving electromagnetic forces developed in the stators will also operate to attract the articles against the surface of the LIMs which would clamp the article against the face of the stator. If sufficient force were developed to move the article against the clamping force severe marking would result. However, according to the present invention this drag on the movement of the article is completely eliminated by directing a flow of air at high velocity against the surface of the article that is adjacent to the LIM. Such air flow serves to overcome the magnetic forces that are attracting the article to shift the article away from the surface of the LIM just enough to create a gap between the LIM and the moving article. The air flowing at a relatively high velocity creates a cushion of air in the gap. This cushion of air operates as an inverted air bearing. Instead of functioning to lift the moving article from a surface, it operates in the opposite direction against the magnetic forces that tend to shift the moving article toward the LIM for moving the article downwardly away from the surface of the LIM.

The flow of air against the surface of the article is carefully regulated so that the gap between the surface of the LIM housing and the article being moved is relatively small and the article remains within the influence of the magnetic field. Therefore, the moving article is actually suspended in air as it travels along its path of travel. This not only eliminates practically all resistance to the movement of the article but also avoids potential marking or other damage to the moving article because it is out of contact with solid objects while it is moving. Thus, the high quality of the article is maintained.

Several separate LIMs may be employed to advantage in a single system for moving the articles in a particular path and the several motors can be individually controlled so that the articles can be moved in the most efficient manner. The frequency of the current that excites the LIMs regulates the velocity of the articles along the rectilinear path while the amplitude of this current determines the attracting force applied to the articles. Both of these factors can be closely controlled to regulate the movement of the articles. For example by controlling the excitation frequency the article may be stopped directly above the stack and only after it is thus accurately positioned is the current amplitude deenergized for releasing the article to drop in a vertical path onto the stack.

It is therefore a general object of the present invention to provide an improved system for transporting articles along a path of travel with the elimination of substantially all resistance to the movement of the articles along the path for vastly increased efficiency of operation.

A further object is to provide an improved system for transferring articles from one location to another and drop them onto a stack after they are stopped at the second location.

Another object is to provide an improved system for transferring articles of different sizes and different configuration from one location to another and drop each size or each configuration on a different stack.

A further object of the present invention is to provide an improved transport system for moving articles along a predetermined path that is of simple construction but very efficient in operation.

BRIEF DESCRIPTION OF THE DRAWING

The foregoing and other objects of this invention, which will become more fully apparent from the following detailed description, may be achieved by means of the exemplifying apparatus depicted in and set forth in this specification in connection with the accompanying drawings, in which.

DETAILED DESCRIPTION OF THE PREFERRED EMBODIMENT

Figure 1:
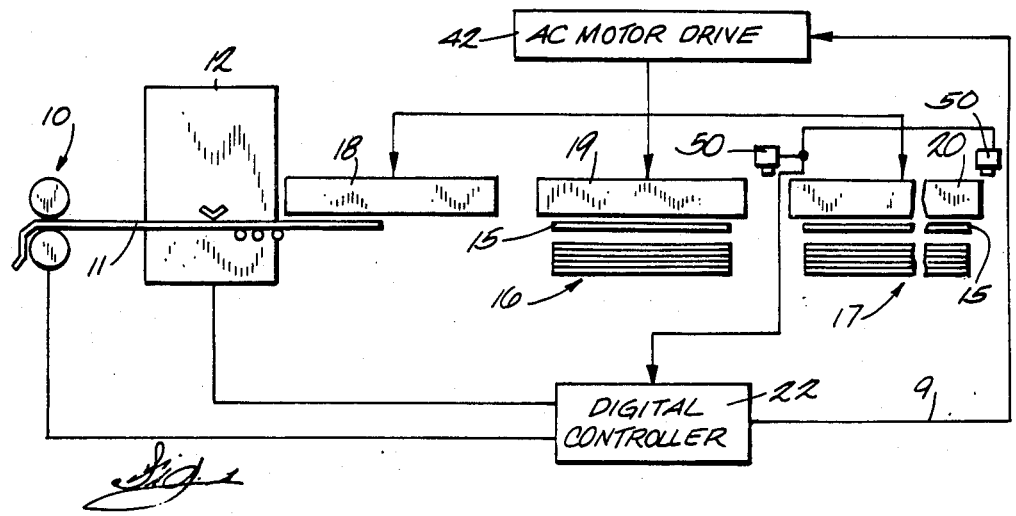
FIG. 1 is a schematic view illustrating a transport system incorporating the features of the present invention and disposed to receive panels from a machine tool for transfer to several stacks selectively.

Reference is now made more particularly to the drawings and specifically to FIG. 1 thereof which illustrates a manufacturing installation including a transport system incorporating the features of the present invention. As there shown, a feeding mechanism generally identified by the reference numeral 10 is depicted as feeding sheet material 11 to a fabricating machine 12 which would be a press, shear or the like. In the illustrated embodiment, the machine 12 cuts the material 11 into panels 15 that are to be positioned on stacks 16 and 17 selectively.

Figure 4:
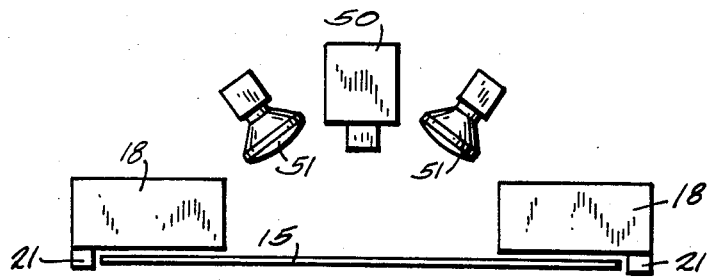
FIG. 4 is a fragmentary view in front elevation depicting a pair of spaced linear induction motors with a scan camera between them for sensing the positions of the articles being transported.

The panels 15 are transported from the machine 12 by three pair of linear induction motors 18, 19 and 20 that are in alignment with each other, and disposed successively along the path of travel of the panels 15. Each pair of motors is spaced from each other so that the panels 15 will span the space adjacent to the outer edge of one of the pair of motors to the outer edge of the other pair. A fence 21 depends from the outer edge of each of the motors as shown in FIG. 4 and the panels 15 travel between these two fences 21. Accordingly, the fences serve as longitudinal guides for the panels 15 as they move in their path of travel. Three pairs of motors 18, 19 and 20 are illustrated in the present embodiment but it should be understood that any number of such pairs of motors can be provided and they can be of any length most suitable for convenient operation.

Each pair of linear induction motors 18, 19 and 20 is independently regulated by a digital controller 22. The digital controller 22 also operates the feeding mechanism 10 as well as the machine 12 so that the operation of the various elements of the installation are coordinated. The operation of the feeding mechanism is described in U.S. Pat. No. 4,491,777 issued on Jan. 1, 1985.

The flat linear induction motors 18, 19 and 20 are identical to each other so that the description of one applies to all of them. It will be assumed that the linear motor 18 is illustrated in FIGS. 2 and 3, and as there shown, it includes a rectangular metal enclosure having a base plate 25 as well as a top plate 26 that are spaced from each other by end walls 27 and side walls 28.

Figure 2:
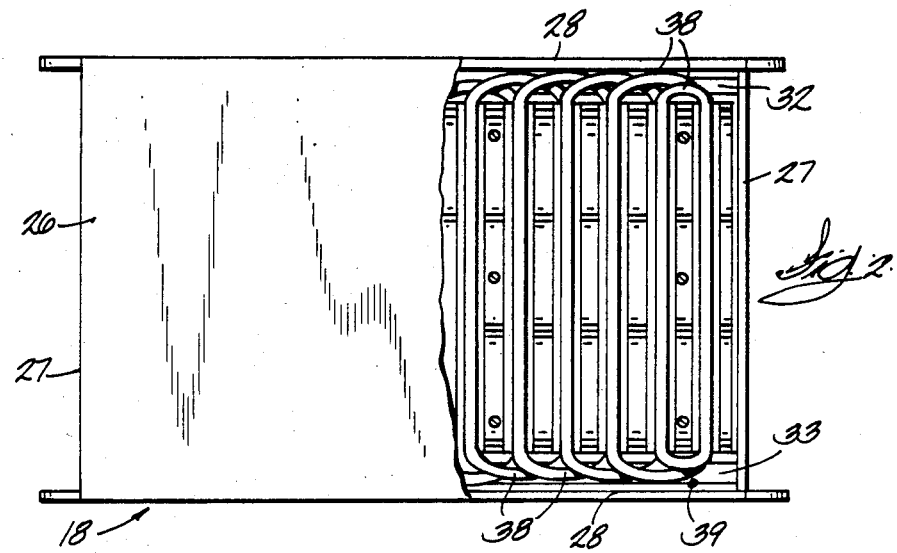
FIG. 2 is a plan view of a linear induction motor employed in the assembly of FIG. 1 with portions broken away to show the interior structure.
Figure 3:
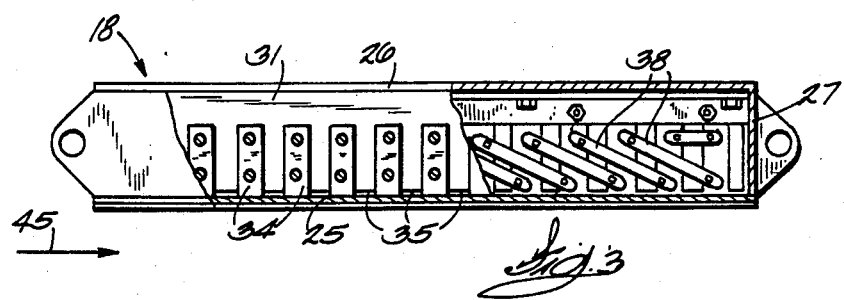
FIG. 3 is an elevational view of the linear induction motor shown in FIG. 2 with portions broken away to illustrate the stator winding.

As shown in FIGS. 2 and 3, the linear induction motors are formed by fastening together thin sheets of magnetic steel 31 that are attached to the base plate 25 by angle irons 32 and 33 which extend along the length of the side walls 28. The sheets of steel 31 are shaped to form teeth 34 that define pole faces 35 at their ends. The teeth 34 extend the entire lateral extent of the motors and they define slots between them which receive stator windings 38.

Figure 6:
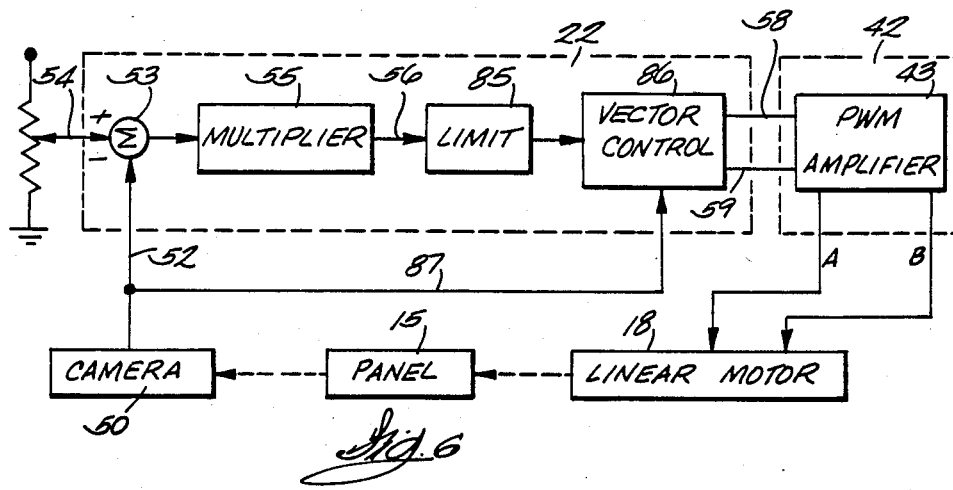
FIG. 6 is a block diagram of a control circuit for the illustrated embodiment.
Figure 7:
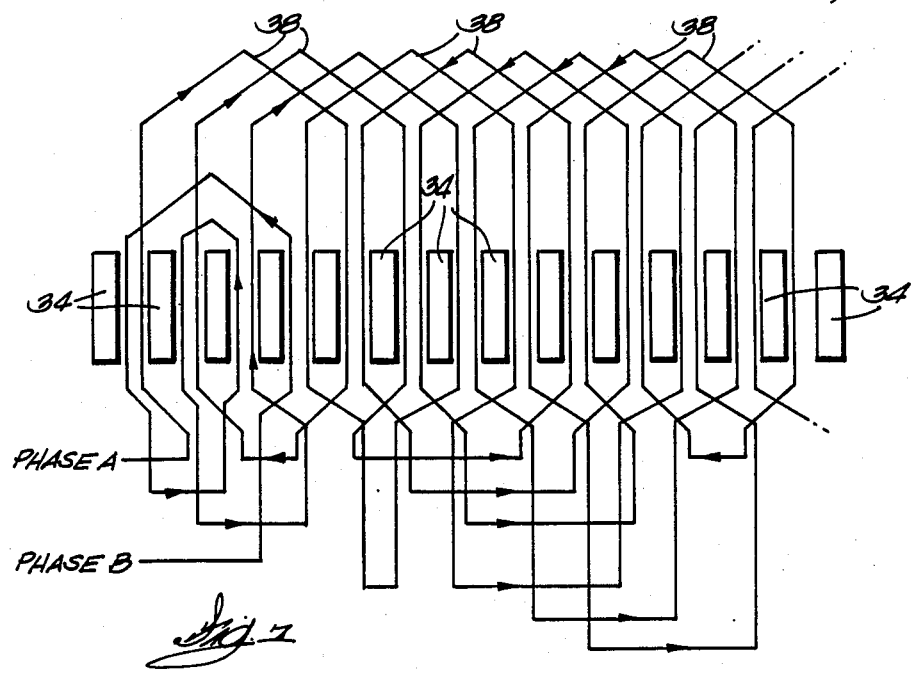
FIG. 7 is a schematic representation of the stator windings and connections for the linear induction motor of FIG. 3.

Referring particularly to FIGS. 1, 6 and 7, the stator windings 38 in each linear induction motor 18, 19 and 20 are separately driven by an A.C. motor drive 42. The A.C. motor drive 42 includes a separate current source, pulse width modulated (PWM) amplifier 43 for each linear motor 18, 19 and 20. Each PWM amplifier 43 receives sinusoidal command signals (Iosin wt + and Io cos wt +) at its respective inputs 58 and 59; and in response thereto, produces a two-phase A.C. current in the windings 38 of its attached linear induction motor 18, 19 or 20. A PWM amplifier 43 such as that described in "A Current-Controlled PWM Transistor Inverter Drive", reprinted from IEEE/IAS 1979 Annual Meeting by A. B. Plunkett may be used for this purpose.

The A.C. currents applied to each linear motor 18, 19 and 20 produces a moving magnetic field. This moving magnetic field interacts with the currents it induces in the panels 15 to provide a driving force. By controlling the phase order, frequency and the magnitude of the A.C. currents supplied to the linear motors 18, 19 and 20, the direction, the position, the velocity and the acceleration of the sheet material 15 can be precisely controlled. The velocity of the panels 15 along their path of travel can be accurately controlled by regulating the frequency of the A.C. current produced by the A.C. motor drive 42. Moreover, by controlling the amplitude of the A.C. current produced by the PWM amplifier 43, the magnetic forces operating to attract the panels 15 toward the linear motors can likewise be regulated.

Referring particularly to FIGS. 1 and 6, the current source PWM amplifiers 43 are operated to independently control the amplitude, frequency and phase of the current that is used to excite the stator of each motor. The current command signals are generated by the common digital controller 22 and applied to the inputs 58 and 59 on each PWM amplifier 43. These connections are indicated collectively in FIG. 1 by the cable 9. At times the controller 22 will run the several motors 18, 19 and 20 at different frequencies. However, when transferring the panel 15 from one of the pair of motors to the succeeding pair of motors, the controller 22 will synchronize the frequency, amplitude and phase of the motor excitation currents to make the two motor pairs appear to the panel 15 as one continuous motor.

The speed of the panels 15 along their path of travel is approximately proportional to the frequency of the excitation currents. The panel 15 is accelerated by increasing the frequency and decelerated by reducing the frequency. The frequency can actually reverse through zero and move the part in the reverse direction when that becomes necessary.

The specific connections of the winding terminals to the A.C. motor drive 42 are shown in FIG. 7. By connecting the stator windings as shown and connecting them to receive the two-phase, sinusoidal current, a magnetic wave is produced which runs, or travels, in the direction indicated by the arrow 45 in FIG. 3. The velocity of the running magnetic wave is determined by the frequency of the applied current as previously mentioned. This magnetic wave induces an emf in the conductive panels 15 and the emf causes a current to flow in them. The induced current in the panels 15 interacts with the running magnetic waves to produce a force that powers the panels 15 toward the stacks 16 and 17. The magnitude of this induced force is a function of the stator winding current.

Figure 5:
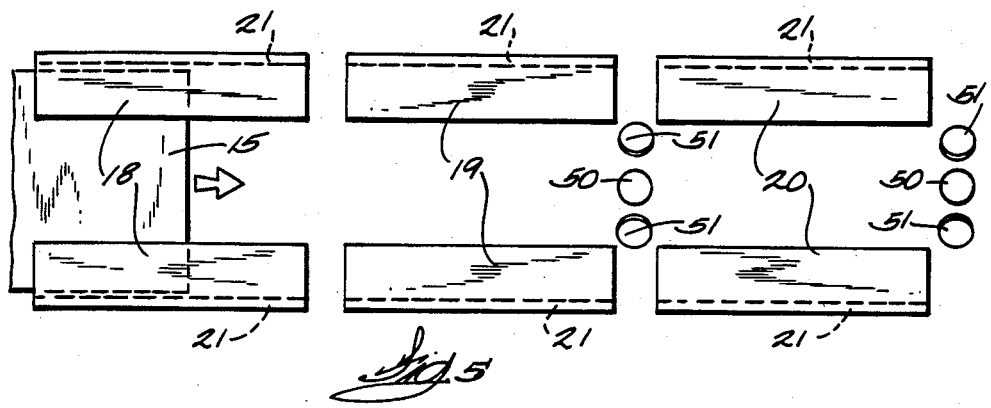
FIG. 5 is a plan view of the linear induction motors shown in FIG. 4.

Referring to FIGS. 4 and 5, for the purpose of detecting the position of the panels 15 as they move along their path of travel, a line scan camera 50 is mounted between the two motors 19 at the end of the stack 16 for controlling the movement of the panels as they approach the stack 16. Another line scan camera 50 is mounted between the pair of motors 20 at the end of the stack 17 for controlling the movement of the panels 15 as they approach the stack 17. A light 51 is mounted on each side of the line scan cameras 50 illuminating the area that is being viewed. Cameras such as the LC310 series from Reticon Corporation are employed for this purpose.

The line scan camera 50 functions in the circuit as shown in the block diagram of FIG. 6 to provide both speed and position feedback information to the digital controller 22. The line scan camera 50 transmits a position feedback signal over a conductor 52 to a summing point 53, where it is compared with a position command signal representing the desired position of the panel 15. The position command signal is applied through input 54 and is produced by a manually adjustable potentiometer or the like. An error signal is outputted from the summing point 53 and is coupled to a multiplier 55 which produces an output that determines the frequency of the current to be applied to the attached linear motor. The output of the multiplier 55 is applied to a limiting circuit 85 which limits the frequency to the desired maximum speed of the panels 15. This frequency, or velocity command signal from the circuit 85 is applied as one input to a vector controller 86.

When the panel 15 is out of range of the camera, the error signal from the summing point 53 is at its maximum and the velocity command signal causes the panel 15 to move toward the camera at its maximum rate of travel. As the panel 15 approaches the desired position, the error signal, and consequently, the output frequency is reduced to bring the panel 15 to a smooth stop. Should the panel overshoot the desired stopping point, the polarity of the error signal and the driving force is reversed to bring the panel back to the desired position.

The vector controller 86 receives the velocity command from limiter 85, and a velocity feedback signal through a line 87 from the camera 50. It sums these two signals and produces the sinusoidal current command signals on the lines 58 and 59 using conventional vector control techniques. The particular method employed is described in a 1982 IAS Conference paper by George Kaufman, Luis Garces and Gerald Gallagher entitled "High-Performance Servo Drives For Machine Tool Applications Using AC Motors".

Referring to FIG. 1, once the panel 15 is stopped beneath either the pair of motors 19 or the pair of motors 20, the panel 15 is dropped to the associated stack 16 or 17. The dropping of the panel 15 is accomplished by forcing the current in the motor 19 or 20 to zero to rapidly collapse the magnetic field in the motor. Controlling current in this manner actually causes a reversal in motor voltage that forces the magnetic field to zero more quickly than if the current was allowed to decay.

Figure 8:
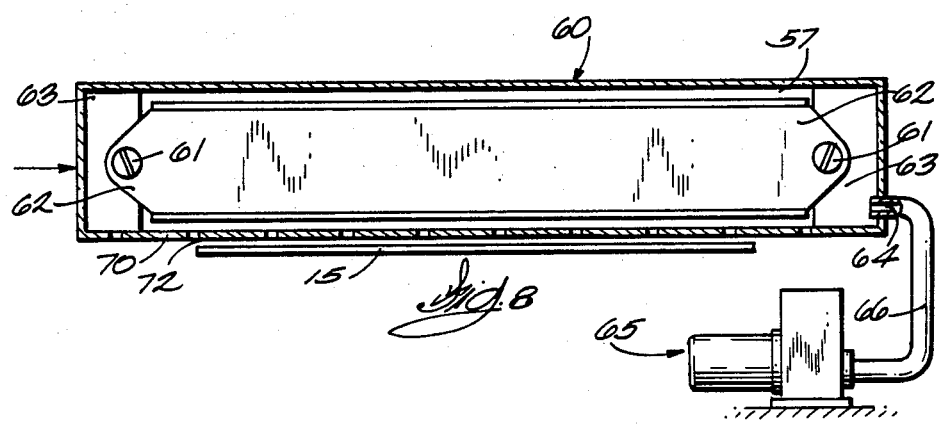
FIG. 8 is an elevational view of a linear induction motor housing adapted to create an air bearing with the housing broken away to show the linear induction motor supported within the housing.

As the panels 15 travel along the designated path, the magnetic field generated by the linear motors 18, 19 and 20 operates to attract the panels toward the pole faces 35 and the force of such attraction is dependent upon the amplitude of the current in the windings 38. In order to overcome this attracting force, air under pressure is directed against the panels 15 in a direction to oppose the attracting force developed by the magnetic field. To this end, as shown in FIG. 8, each of the linear induction motors 18, 19 and 20 is supported in a chamber 57 formed within a rectangular housing generally identified by the reference numeral 60. The linear induction motor is supported within the housing 60 by screws 61 extending through mounting tabs 62 that extend from the linear induction motors with the screws being in threaded engagement with suitable threaded openings formed in mounting plates 53 that extend inwardly from each end of the housing 60.

Air pressure is developed in the chamber 57 of the housing 60 by a blower generally identified by the reference numeral 65. The blower 65 is connected to an inlet port 64 in the housing 60 by a conduit 66.

The various joints of the housing 50 are sealed so that pressure can be developed within the chamber 57. However, a bottom plate 70 of the housing 60 is provided with a plurality of perforations 71 as best shown in FIG. 9, formed in a particular pattern to permit the escape of air under pressure from the chamber 57.

The air exhausted through the perforations 71 flows at a relatively high velocity and impinges upon the upper surface of the panels 15 as they are being transported by the linear induction motors 18, 19 and 20. Such air pressure against the surface of the panels 15 acts against the magnetic force that is attracting the panels toward the pole faces 35. The pressure of the air in the chamber 57 is regulated so that it is just sufficient to move the panels 15 away from the surface of the plate 70 to create a gap 72 between the plate 70 and the panels 15 as they are being transported through the system. The pressure is insufficient to displace the panels 15 from the magnetic field. As a result, the panels 15 are actually suspended in air as they are traversing their path of travel from the machine 12 to the stack 16 or 17. Thus, substantially all friction between the traveling panels 15 and adjacent surfaces is eliminated.

Figure 9:
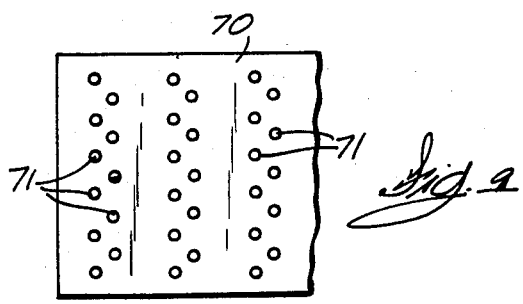
FIG. 9 is a fragmentary bottom view of the housing shown in FIG. 5 to illustrate the perforations in the bottom panel of the housing for creating the air bearing for the articles being transported.

It has been found that if the holes 71 are 0.040" in diameter and 94 such holes are formed in the bottom plate 70, distributed as shown in FIG. 9, a 2 psi supply pressure will develop a half psi pressure against the plate 15. This will move the panel 15 approximately 0.005" from the bottom surface of the plate 70.

In the absence of this air pressure, the magnetic field would attract the panel 15 against the bottom surface of the bottom plate 70 and a very high frequency would have to be developed to move the panel 15 against this force along the bottom surfaces of the motors 18, 19 and 20. This would create a very high drag and severe markings would be formed on the surface of the panel 15. By introducing the air pressure into the chamber 58, and permitting it to escape through the holes 71, an air cushion is formed between the bottom face of the plate 70 and the upper face of the panel 15. This eliminates all drag on the panel 15 and allows the magnetic field to propel the panel 15 in its path of travel with a very minimum of resistance. Moreover, since there is no contact between the panel 15 and the surface of the plate 70, no marking of the surface of the panel 15 occurs, and when it is dropped onto the stack 16 or 17, it is of the same quality as it was when it left the machine 12.

The air flowing through the perforations 71 in the construction shown in FIG. 8 forms an inverted air bearing. Instead of lifting the article to be transferred from an upwardly facing surface to eliminate friction, as has been done in conventional air bearing arrangements, the construction in FIG. 8 develops the flow of air in a direction to move the panels 15 in a downward direction against the magnetic force tending to attract the plate upwardly.

In the illustrated embodiment, the air bearing is shown operating in a downward direction against the attraction developed by the magnetic field because this arrangement is especially adapted for moving panels fabricated of magnetic material and dropping them onto stacks, such as the stacks 16 and 17. However, the structure of the present invention can just as well be operated in the opposite direction with the pole faces 35 facing upwardly and the perforated plate 70 developing air pressure in the upward direction to lift the articles being transferred in an upward direction against, not only the force developed by the magnetic field, but against gravity as well.

In the illustrated embodiment the panels 15 are shown being dropped on either one of two stacks 16 or 17 selectively. The control operates the linear induction motors 18, 19 or 20 independently of each other to stop the movement of the panels 15 above either the stack 16 or above the stack 17. Articles of one type may be placed on the stack 16 and articles of another type on the stacks 17. In the alternative, the workpieces being dropped from the transport system can be identical so that the pallet containing the panels 15 on stack 16 can be removed and an empty pallet placed in position, while the panels 15 are being placed on the stack 17 and vice versa. In addition, the control 22 can be arranged to regulate the operation of the motors so that the panels 15 are staggered on both of the stacks 16 and 17 to facilitate their removal.

From the foregoing detailed description of the illustrative embodiments set forth herein to exemplify the present invention, it will be apparent that there has been provided an improved article transport system in which linear induction motors are employed for moving the articles along a path of travel and such motors are operated in conjunction with an air bearing that moves the articles away from the surface of the motor to create a gap between the motor stator and the moving articles to eliminate all friction between the moving articles and the physical surface of the stator. The moving articles may be dropped onto either one of a plurality of stacks selectively by controlling the excitation current to the motor stator to regulate its operation. On the other hand, the motor stator may be faced upwardly and the air bearing used to lift the moving article away from the stator and against the force of gravity to create a gap between the motor stator and the moving articles.

Although the illustrative embodiment of the invention has been described in considerable detail for the purpose of disclosing a practical operative structure whereby the invention may be practiced advantageously, it is to be understood that the apparatus described is intended to be illustrative only and that the novel characteristics of the invention may be incorporated in other structural forms without departing from the spirit and scope of the invention, as defined in the subjoined claims.

The principles of this invention having now been fully explained in connection with the foregoing description we hereby claim as our invention:

1. A transport mechanism for transporting articles formed of a magnetic material along a path of travel comprising:
   a linear induction motor stator fixedly mounted along the desired path of travel, means for energizing said stator with an alternating multiphase current to produce a moving magnetic field along the path of travel, a control connected to regulate the operation of said induction motor, means connected to furnish said control with command signals representing the desired movement of the articles being transported, means in said control for regulating the frequency of the alternating current supplied to said induction motor for controlling the velocity of the articles along the path of travel in accordance with said command signals, means in said control for regulating the amplitude of the alternating current supplied to said induction motor for varying the magnetic force attracting the articles to the induction motor in accordance with said command signals, at least one line scan camera disposed along the path of travel in position to scan the articles as they are being moved by said induction motor, and means connecting said line scan camera to transmit position feedback signals and velocity feedback signals to said control for tracking the instant position and the rate of travel of the article that is within the view of said camera.

2. A transport mechanism according to claim 1 including a source of air pressure applied against the articles being transported in a direction opposite to the attraction of the magnetic field to shift the articles away from the stator to create a gap between the linear induction motor stator and the articles without removing the articles from the influence of the magnetic field so that the articles are suspended in air as they are moved along the path of travel by the moving magnetic field.

3. A transport mechanism according to claim 2 including a plurality of linear induction motor stators supported along the desired path of travel so that each article moves along the several stators successively, and individual control means for each of said stators so that the movement of several articles along the path of travel can be separately controlled and the articles can be dropped onto any one of several stacks selectively.

4. A transport mechanism according to claim 3, including means in said control for synchronizing the frequency, amplitude and phase of adjacent motors when the article is transferring from one motor to the next adjacent motor so that the two adjacent motors operate as one continuous motor while an article is moving from one motor to the next.

5. A transport mechanism according to claim 4, wherein said linear induction motor stators are inverted so that the articles are moving beneath said stator and are retained in operating position with said stator by the magnetic attraction overcoming the force of gravity, and the movement of the articles can be stopped at a predetermined location and released by controlling the magnetic field to drop the articles by gravity onto a stack.

* * * * *